UNITED STATES PATENT OFFICE.

ALFRED A. WELLS, OF MONTCLAIR, NEW JERSEY, ASSIGNOR, BY MESNE ASSIGNMENTS, TO SETH B. HUNT, TRUSTEE, OF MOUNT KISCO, NEW YORK.

PROCESS OF MAKING UNSATURATED HYDROCARBON MATERIAL.

1,418,414.  Specification of Letters Patent.  Patented June 6, 1922.

No Drawing.  Application filed October 9, 1916.  Serial No. 124,599.

*To all whom it may concern:*

Be it known that I, ALFRED A. WELLS, a citizen of the United States, and a resident of Montclair, in the county of Essex and State of New Jersey, have invented certain new and useful Improvements in Processes of Making Unsaturated Hydrocarbon Material, of which the following is a specification.

This invention relates to the production of highly unsaturated olefine-containing hydrocarbons. When petroleum oil is cracked in a pressure still, for example that of the Burton type, the oil subjected for the first time to such treatment affords a product whose olefine content, generally speaking, is relatively low. On account of mechanical difficulties cracking is allowed to progress only until the still bottoms are of substantially the consistency of tar. A large amount of carbon is deposited with this material. When a sufficient quantity of these still bottoms have accumulated they are distilled in a tar still and a residue of carbon is obtained. The distillate from the latter operation may again be subjected to the cracking treatment in a pressure still. The olefine content of this material is higher than that of the products of the first cracking, and the olefines obtained are well adapted for the production of alcohols. The still bottoms from this operation may be redistilled to free them from carbon and the distillate again subjected to the pressure cracking. This distillate is perhaps even more suitable for alcohol production than the second distillate. This procedure may be carried on indefinitely accumulating the still bottoms from the various operations until sufficient material is on hand to make a charge in the pressure still.

It is customary in cracking fuel oil in pressure stills of the character mentioned to use a pressure of 60–75 pounds per square inch, but when using the distillate from the still bottoms of this operation, in accordance with this invention, a somewhat lower pressure, say from 30–50 pounds per square inch is preferred. This reduction in pressure gives a higher olefine content and consequently a product which is more suitable for the production of alcohols.

To recapitulate, my invention comprises the recracking of a cracked oil or residue obtained from a previous cracking operation so as to produce reactive olefines in abundance, such recracking being performed under ordinary atmospheric pressure, or at higher pressures but preferably at pressures between 30 and 60 pounds per square inch superatmospheric pressure.

What I claim is:—

1. The process of cracking hydrocarbon oils under high pressure until still bottoms of a tarry consistency are formed, distilling such still bottoms, and recracking the distillate under pressure lower by at least one atmosphere than that at which originally cracked, whereby hydrocarbon material is obtained rich in unsaturated hydrocarbons adapted for extraction with sulfuric acid without undue rise in temperature.

2. The process of cracking hydrocarbon oils under pressure of about seventy-five (75) pounds per square inch until tarry still bottoms are formed, distilling such still bottoms to free them of solid material, and recracking the distillate at a pressure of about thirty to sixty pounds per square inch to form hydrocarbon material rich in unsaturated hydrocarbon material adapted for extraction thereof by means of sulfuric acid.

3. The process which consists in cracking hydrocarbon oils until still bottoms of tarry consistency are formed, distilling the still bottoms to free them from solid material, and recracking the material so obtained at a pressure of about thirty to sixty pounds per square inch whereby hydrocarbon material is obtained rich in unsaturated hydrocarbon materials.

ALFRED A. WELLS.